Patented Oct. 21, 1952

2,615,013

UNITED STATES PATENT OFFICE 2,615,013

2,4-BIS(METHYLSULFONYL)-BENZENEAZO-N-FLUOROALKYL-N-HYDROXYALKYLAN-ILINE COMPOUNDS

Joseph B. Dickey, Rochester, N. Y., assignor to Eastman Kodak Company, Rochester, N. Y., a corporation of New Jersey No Drawing. Application July 21, 1950, Serial No. 175,283

7 Claims. (Cl. 260—207.3)

This invention relates to new azo compounds and their application to the art of dyeing or coloring textile materials made of or containing a cellulose alkyl carboxylic acid ester having two to four carbon atoms in the acid groups thereof.

I have discovered that the new azo compounds having the general formula:

I. 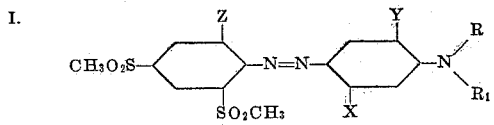

wherein R represents a —CH$_2$CHF$_2$ group, a —CH$_2$CF$_3$ group, a —CH$_2$CF$_2$CH$_3$ group, a —CH$_2$CH$_2$CHF$_2$ group or a —CH$_2$CH$_2$CF$_3$ group, R$_1$ represents a β-hydroxyethyl group, a β-hydroxypropyl group, a γ-hydroxypropyl group or a β,γ-dihydroxypropyl group, X represents a hydrogen atom, a chlorine atom, a bromine atom, a methyl group or an ethyl group, Y represents a hydrogen atom, Z represents a hydrogen atom, a chlorine atom or a bromine atom and wherein Y also represents a methoxy group when X is a chlorine atom or a bromine atom are valuable dyes for coloring textile materials made of or containing a cellulose alkyl carboxylic acid ester having two to four carbon atoms in the acid groups thereof. These dye compounds when applied to the aforesaid materials give dyeings which have excellent light and gas fastness properties. They are particularly of use for the coloration of cellulose acetate textile materials. Those compounds wherein Z is a hydrogen atom yield dyeings having yellowish-orange to red shades whereas those compounds wherein Z is a chlorine or bromine atom yield dyeings having brownish-orange to brownish-red shades.

It is an object of my invention to provide new azo dye compounds. Another object is to provide a satisfactory process for the preparation of the new azo dye compounds of the invention. A further object is to provide dyed cellulose alkyl carboxylic acid ester textile materials which possess very good fastness to light and gas. A particular object is to provide new azo compounds which are especially of value for the dyeing of cellulose acetate textile materials.

By cellulose alkyl carboxylic acid esters having two to four carbon atoms in the acid groups thereof, I mean to include, for example, both hydrolyzed and unhydrolyzed cellulose acetate, cellulose propionate, cellulose butyrate, cellulose acetate-propionate and cellulose acetate-butyrate.

The new azo dye compounds of my invention are prepared by diazotizing a primary aromatic amine having the formula:

II. 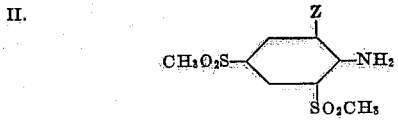

and coupling the diazonium compound obtained with a compound having the formula:

III. 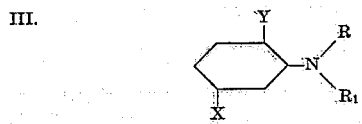

R, R$_1$, X, Y and Z in the foregoing formulas have the meaning previously assigned to them.

The aromatic amine compounds having the formula II that are used in the preparation of the azo compounds of my invention are: 2,4-bis-(methylsulfonyl)-aniline, 6-bromo-2,4-bis-(methylsulfonyl)-aniline and 6-chloro-2,4-bis-(methylsulfonyl)-aniline.

Typical of the coupling compounds having the formula III that are used in the preparation of the azo compounds of my invention are: N-2,2-difluoroethyl - N - β - hydroxyethylaniline, N - 2,2 - difluoro - n - propyl - N - β - hydroxyethylaniline, N - 3,3 - difluoro - n - propyl - N - β - hydroxyethylaniline, N - 2,2,2 - trifluoroethyl - N - β - hydroxyethylaniline, N - 3,3,3 - trifluoropropyl - N - β - hydroxyethylaniline, N - 2,2 - difluoroethyl - N - β - hydroxypropylaniline, N - 2,2 - difluoroethyl - N - γ - hydroxypropylaniline, N - 2,2 - difluoroethyl - N - β,γ - dihydroxypropylaniline, N - 2,2 - difluoro - n - propyl - N - β - hydroxypropylaniline, N - 2,2 - difluoroethyl - N - β - hydroxyethyl - m - toluidine, N - 2,2 - difluoroethyl - N - β - hydroxyethyl - m - ethylaniline, N - 2,2 - difluoroethyl - N - β - hydroxyethyl - m - chloraniline, N - 2,2 - difluoroethyl - N - β - hydroxyethyl - m - bromoaniline, N - 2,2 - difluoroethyl - N - β - hydroxypropyl - m - toluidine, N - 2,2 - difluoroethyl - N - β - hydroxypropyl - m - chloroaniline, N - 2,2 - difluoroethyl - N - β - hydroxypropyl - m - bromoaniline, N - 2,2,2 - trifluoroethyl - N - β - hydroxypropylaniline, N - 2,2,2 - trifluoroethyl - N - γ - hydroxypropylaniline, N - 2,2,2 - trifluoroethyl - N - β,γ - dihydroxypropylaniline, N - 2,2,2 - trifluoroethyl - N - β - hydroxyethyl - m - toluidine, N - 2,2,2 - trifluoroethyl - N - β - hydroxyethyl - m - chloroaniline, N - 2,2,2 - trifluoroethyl - N - β - hydroxyethyl - m - bromoaniline, N - 2,2,2 - trifluoroethyl - N - β - hydroxypropyl - m - toluidine, N - 2,2,2 - trifluoroethyl - N - β - hydroxypropyl - m - chloroaniline, N - 2,2-difluoroethyl - N - β - hydroxyethyl - 2 - methoxy - 5 - chloroaniline, N - 2,2 - difluoroethyl - N - β - hydroxyethyl - 2 - methoxy - 5 - bromoaniline, N - 2,2,2 - trifluoroethyl - N - β - hydroxyethyl - 2 - methoxy - 5 - chloroaniline, N - 2,2 - difluoro - n - propyl - N - β - hydroxyethyl - 2 - methoxy - 5 - chloroaniline, N - 3,3 - difluoropropyl - N - β - hydroxyethyl - 2 - methoxy - 5 - chloroaniline, N - 3,3,3 - trifluoropropyl - N - β - hydroxyethyl - 2 - methoxy - 5 - chloroaniline, N - 2,2 - difluoroethyl - N - β - hydroxypropyl - 2 - methoxy - 5 - chloroaniline, N - 2,2 - difluoroethyl - N - γ - hydroxypropyl - 2 - methoxy - 5 - bromoaniline, N - 2,2 - difluoroethyl - N - β,γ - dihydroxypropyl - 2 - methoxy - 5 - chloroaniline, N - 2,2,2 - trifluoroethyl - N - β,γ - dihydroxypropyl - 2 - methoxy - 5 - bromoaniline, N - 2,2 - difluoro - n - propyl - N - β,γ - dihydroxypropyl - 2 - methoxy - 5 - chloroaniline and N - 2,2 - difluoro - ethyl - N - γ - hydroxypropyl - 2 - methoxy - 5 - chloroaniline.

The following examples illustrate the azo compounds of my invention and their manner of preparation. Parts are expressed as parts by weight.

EXAMPLE 1

A. Nitrosyl sulfuric acid 7.6 parts of dry sodium nitrite are added with stirring to 92 parts of sulfuric acid (sp. gr. 1.84) while keeping the temperature below 70 C. The resulting solution is then cooled to 5-10 C. and 100 parts of acetic acid are added dropwise, with stirring, while maintaining the temperature at 5-10 C.

B. Diazotization 24.9 parts of 2,4-bis(methylsulfonyl)-aniline are added slowly, with stirring, to the nitrosyl sulfuric acid prepared as described above, while keeping the temperature below 20 C. When all the 2,4-bis(methylsulfonyl)-aniline has been added, 100 parts of acetic acid are added dropwise, with stirring, keeping the temperature between 15-20 C., and stirring is continued until all the 2,4-bis(methylsulfonyl)-aniline has dissolved and diazotization is complete. The diazonium solution thus formed is then poured onto 500 parts of crushed ice, and enough urea is added to destroy the excess nitrous acid. The diazonium solution should be clear and free of suspended undiazotized amine.

C. Coupling

A sulfuric acid solution is prepared by adding 10 parts of sulfuric acid (sp. gr. 1.84) to 20 parts of water. The sulfuric acid solution thus formed is cooled to 5 C. and 20.1 parts of N-2,2-difluoroethyl-N-β-hydroxyethylaniline are added with cooling. When solution is complete, 200 parts of ice and 200 parts of cold water are added. The diazonium solution prepared as described in B is then added slowly, with stirring, after which just sufficient sodium carbonate to neutralize the sulfuric acid is added portionwise. Enough diazonium solution should be used to give a slight test with β-naphthol paper when all of the coupling compound has reacted.

The dye compound formed precipitates and is recovered by filtration, on a Buchner funnel, for example, washed free of salts with cold water, and dried at 50 C. 45.2 parts of the dye compound, 2,4 - bis(methylsulfonyl) - benzeneazo-N-2,2-difluoroethyl-N-β-hydroxyethylaniline, having the formula:

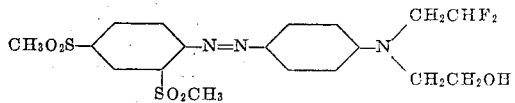

and melting at 200–201 C. are obtained. It colors cellulose acetate textile materials orange shades.

It should be here noted that equally good dyes have been obtained when coupling was carried out in acetic acid or dilute hydrochloric acid.

EXAMPLE 2

By the use of 21.5 parts of N-2,2-difluoro-n-propyl-N-β-hydroxyethylaniline in place of N-2,2 - difluoroethyl - N - β - hydroxyethylaniline in Example 1, the dye compound having the formula:

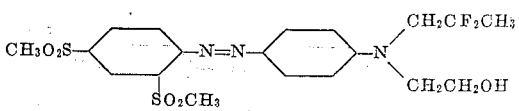

is obtained. It colors cellulose acetate textile materials orange shades.

EXAMPLE 3

By the use of 21.9 parts of N-2,2,2-trifluoroethyl-N-β-hydroxyethylaniline in place of N-2,2-difluoroethyl - N - β - hydroxyethylaniline in Example 1, the dye compound having the formula:

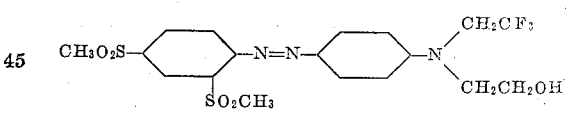

is obtained. It colors cellulose acetate textile materials yellowish-orange shades.

EXAMPLE 4

28.4 parts of 6-chloro-2,4-bis(methylsulfonyl)-aniline are diazotized in accordance with the procedure described in Example 1 for the diazotization of 2,4-bis(methylsulfonyl) - aniline and the diazonium compound obtained is coupled with 20.1 parts of N-2,2-difluoroethyl-N-β-hydroethylaniline. Coupling and recovery of the dye compound formed is carried out in accordance with the procedure described in Example 1. The dye compound obtained has the formula:

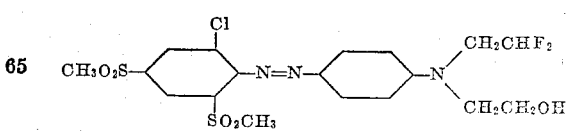

It colors cellulose acetate textile materials brownish-orange shades.

EXAMPLE 5

By the use of 23.5 parts of N-2,2-difluoroethyl-N-β-hydroxyethyl-m-chloroaniline in place of N-2,2 - difluoroethyl-N-β-hydroxyethylaniline in Example 1, the dye compound having the formula:

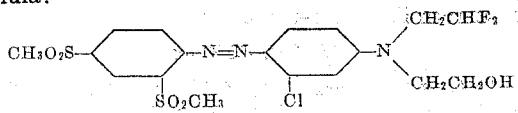

is obtained. It colors cellulose acetate textile materials orange shades.

EXAMPLE 6

28.4 parts of 6-chloro-2,4-bis(methylsulfonyl)-aniline are diazotized and the diazonium compound obtained is coupled with 21.9 parts of N-2,2,2-trifluoroethyl-N-β-hydroxyethylaniline. Coupling and recovery of the dye compound formed is carried out in accordance with the procedure described in Example 1. The dye compound obtained colors cellulose acetate textile materials brownish-orange shades.

EXAMPLE 7

28.4 parts of 6-chloro-2,4-bis(methylsulfonyl)-aniline are diazotized and the diazonium compound obtained is coupled with 21.5 parts of N-3,3-difluoropropyl-N-β-hydroxyethylaniline. Coupling and recovery of the dye compound formed is carried out in accordance with the procedure described in Example 1. The dye compound obtained colors cellulose acetate textile materials brownish-orange shades.

EXAMPLE 8

32.9 parts of 6-bromo-2,4-bis(methylsulfonyl)-aniline are diazotized in accordance with the procedure described in Example 1 for the diazotization of 2,4-bis(methylsulfonyl)-aniline and the diazonium compound obtained is coupled with 20.1 parts of N-2,2-difluoroethyl-N-β-hydroxyethylaniline. Coupling and recovery of the dye compound formed is carried out in accordance with the procedure described in Example 1. The dye compound obtained colors cellulose acetate textile materials brownish-orange shades.

EXAMPLE 9

By the use of 23.3 parts of N-3,3,3-trifluoropropyl-N-β-hydroxyethylaniline in place of N-2,2-difluoroethyl-N-β-hydroxyethylaniline in Example 1, a dye compound is obtained which colors cellulose acetate textile materials orange shades.

EXAMPLE 10

By the use of 21.5 parts of N-2,2-difluoroethyl-N-β-hydroxypropylaniline in place of N-2,2,-difluoroethyl-N-β-hydroxyethylaniline in Example 1, a dye compound is obtained which colors cellulose acetate textile materials orange shades.

EXAMPLE 11

By the use of 21.5 parts of N-2,2-difluoroethyl-N-γ-hydroxypropylaniline in place of N-2,2-difluoroethyl-N-β-hydroxyethylaniline in Example 1, a dye compound is obtained which colors cellulose acetate textile materials orange shades.

EXAMPLE 12

By the use of 23.1 parts of N-2,2-difluoroethyl-N-β,γ-dihydroxypropylaniline in place of N-2,2-difluoroethyl-N-β-hydroxyethylaniline in Example 1, a dye compound is obtained which colors cellulose acetate textile materials orange shades.

EXAMPLE 13

By the use of 21.5 parts of N-2,2-difluoroethyl-N-β-hydroxyethyl-m-toluidine in place of N-2,2-difluoroethyl-N-β-hydroxyethylaniline in Example 1, a dye compound is obtained which colors cellulose acetate textile materials orange shades.

EXAMPLE 14

28.4 parts of 6-chloro-2,4-bis(methylsulfonyl)-aniline are diazotized and the diazonium compound obtained as coupled with 26.1 parts of N-2,2,2-trifluoroethyl-N-β-hydroxypropyl-m-ethylaniline. Coupling and recovery of the dye compound formed is carried out in accordance with the procedure described in Example 1. The dye compound obtained colors cellulose acetate textile materials brownish-orange shades.

EXAMPLE 15

By the use of 28 parts of N-2,2-difluoroethyl-N-β-hydroxyethyl-m-bromoaniline in place of N-2,2-difluoroethyl-N-β-hydroxyethylaniline in Example 1, a dye compound is obtained which colors cellulose acetate textile materials orange shades.

EXAMPLE 16

By the use of 26.3 parts of N-3,3,3-trifluoropropyl-N-β,γ-dihydroxypropylaniline in place of N-2,2-difluoroethyl-N-β-hydroxyethylaniline in Example 1, a dye compound is obtained which colors cellulose acetate textile materials orange shades.

EXAMPLE 17

32.9 parts of 6-bromo-2,4-bis(methylsulfonyl)-aniline are diazotized and the diazonium compound obtained is coupled with 26.5 parts of N-2,2-difluoroethyl-N-β-hydroxyethyl-2-methoxy-5-chloroaniline. Coupling and recovery of the dye compound formed is carried out in accordance with the procedure described in Example 1. The dye compound obtained colors cellulose acetate textile materials brownish-orange shades.

EXAMPLE 18

By the use of 32.8 parts of N-2,2,2-trifluoroethyl-N-β-hydroxyethyl-2-methoxy-5-bromoaniline in place of N-2,2-difluoroethyl-N-β-hydroxyethylaniline in Example 1, a dye compound is obtained which colors cellulose acetate textile materials orange shades.

EXAMPLE 19

28.4 parts of 6-chloro-2,4-bis(methylsulfonyl)-aniline are diazotized and the diazonium compound obtained is coupled with 29.3 parts of N-3,3-difluoropropyl-N-β-hydroxypropyl-2-methoxy-5-chloroaniline. Coupling and recovery of the dye compound formed is carried out in accordance with the procedure described in Example 1. The dye compound obtained colors cellulose acetate textile materials red shades.

EXAMPLE 20

By the use of 32.4 parts of N-2,2-difluoro-n-propyl-N-β-hydroxyethyl-2-methoxy-5-bromoaniline in place of N-2,2-difluoroethyl-N-β-hydroxyethylaniline in Example 1, a dye compound is obtained which colors cellulose acetate textile materials orange shades.

EXAMPLE 21

By the use of 26.7 parts of N-2,2,2-trifluoroethyl-N-γ-hydroxypropyl-m-chloroaniline in place of N-2,2-difluoroethyl-N-β-hydroxyethylaniline in Example 1, a dye compound is obtained which colors cellulose acetate textile materials yellowish-orange shades.

EXAMPLE 22

By the use of 22.9 parts of N-2,2-difluoroethyl-N-β-hydroxyethyl-m-ethylaniline in place of N-2,2-difluoroethyl-N-β-hydroxyethylaniline in Example 1, a dye compound is obtained which colors cellulose acetate textile materials orange shades.

EXAMPLE 23

By the use of 25.3 parts of N-2,2,2-trifluoroethyl-N-β-hydroxyethyl-m-chloroaniline in place of N-2,2-difluoroethyl-N-β-hydroxyethaniline in Example 1, a dye compound is obtained which colors cellulose acetate textile materials yellowish-orange shades.

EXAMPLE 24

32.9 parts of 6-bromo-2,4-bis(methylsulfonyl)-aniline are diazotized and the diazonium compound obtained is coupled with 29.4 parts of N-2,2-difluoroethyl-N-γ-hydroxypropyl-m-bromoaniline. Coupling and recovery of the dye compound formed is carried out in accordance with the procedure described in Example 1. The dye compound obtained colors cellulose acetate textile materials brownish-orange shades.

EXAMPLE 25

By the use of 22.9 parts of N-3,3-difluoropropyl-N-β-hydroxyethyl-m-toluidine in place of N-2,2-difluoroethyl-N-β-hydroxyethylaniline in Example 1, a dye compound is obtained which colors cellulose acetate textile materials red shades.

EXAMPLE 26

28.4 parts of 6-chloro-2,4-bis(methylsulfonyl)-aniline are diazotized and the diazonium compound obtained is coupled with 23.3 parts of N-2,2,2-trifluoroethyl-N-β-hydroxyethyl-m-toluidine. Coupling and recovery of the dye compound formed is carried out in accordance with the procedure described in Example 1. The dye compound obtained colors cellulose acetate textile materials brownish-orange shades.

EXAMPLE 27

By the use of 26.7 parts of N-3,3,3-trifluoropropyl-N-β-hydroxyethyl-m-chloroaniline in place of N-2,2-difluoroethyl-N-β-hydroxyethylaniline in Example 1, a dye compound is obtained which colors cellulose acetate textile materials orange shades.

EXAMPLE 28

28.4 parts of 6-chloro-2,4-bis(methylsulfonyl)-aniline are diazotized and the diazonium compound obtained is coupled with 24.5 parts of N-3,3-difluoropropyl-N-β-γ-dihydroxypropylaniline. Coupling and recovery of the dye compound formed is carried out in accordance with the procedure described in Example 1. The dye compound obtained colors cellulose acetate textile materials brownish-red shades.

EXAMPLE 29

32.9 parts of 6-bromo-2,4-bis(methylsulfonyl)-aniline are diazotized and the diazonium compound obtained is coupled with 24.3 parts of N-2,2-difluoro-n-propyl-N-β-hydroxypropyl-m-toluidine. Coupling and recovery of the dye compound formed is carried out in accordance with the procedure described in Example 1. The dye compound obtained colors cellulose acetate textile materials brownish-red shades.

EXAMPLE 30

28.4 parts of 6-chloro-2,4-bis(methylsulfonyl)-aniline are diazotized and the diazonium compound obtained is coupled with 23.5 parts of N-2,2-difluoroethyl-N-β-hydroxyethyl-m-chloroaniline. Coupling and recovery of the dye compound formed is carried out in accordance with the procedure described in Example 1. The dye compound obtained colors cellulose acetate textile materials brownish-orange shades.

EXAMPLE 31

32.9 parts of 6-bromo-2,4-bis(methylsulfonyl)-aniline are diazotized and the diazonium compound obtained is coupled with 28.1 parts of N-2,2-difluoroethyl-N-β-hydroxyethyl-m-bromoaniline. Coupling and recovery of the dye compound formed is carried out in accordance with the procedure described in Example 1. The dye compound obtained colors cellulose acetate textile materials brownish-orange shades.

EXAMPLE 32

28.4 parts of 6-chloro-2,4-bis(methylsulfonyl)-aniline are diazotized and the diazonium compound obtained is coupled with 22.9 parts of N-2,2-difluoro-n-propyl-N-γ-hydroxypropylaniline. Coupling and recovery of the dye compound formed is carried out in accordance with the procedure described in Example 1. The dye compound obtained colors cellulose acetate textile materials brownish-red shades.

EXAMPLE 33

28.4 parts of 6-chloro-2,4-bis(methylsulfonyl)-aniline are diazotized and the diazonium compound obtained is coupled with 25.1 parts of N-3,3-difluoropropyl-N-β-γ-dihydroxypropyl-m-toluidine. Coupling and recovery of the dye compound formed is carried out in accordance with the procedure described in Example 1. The dye compound obtained colors cellulose acetate textile materials brownish-red shades.

EXAMPLE 34

28.4 parts of 6-chloro-2,4-bis(methylsulfonyl)-aniline are diazotized and the diazonium compound obtained is coupled with 23.3 parts of N-3,3,3-trifluoropropyl-N-β-hydroxyethylaniline. Coupling and recovery of the dye compound formed is carried out in accordance with the procedure described in Example 1. The dye compound obtained colors cellulose acetate textile materials brownish-orange shades.

EXAMPLE 35

32.9 parts of 6-bromo-2,4-bis(methylsulfonyl)-aniline are diazotized and the diazonium compound obtained is coupled with 20.1 parts of N-2,2-difluoroethyl-N-β-hydroxyethylaniline. Coupling and recovery of the dye compound formed is carried out in accordance with the procedure described in Example 1. The dye compound obtained colors cellulose acetate textile materials brownish-orange shades.

Following the procedure described in Examples 1 to 35, inclusive, the dye compounds indicated hereinafter are prepared. The color stated is that which the dyes give on cellulose acetate textile materials.

| Diazo Component | Coupling Component | Color |
| --- | --- | --- |
| 2,4-bis(methylsulfonyl)-aniline | N-2,2-difluoro-n-propyl-N-β-hydroxyethylaniline. | orange. |
| Do | N-2,2-difluoro-n-propyl-N-β-hydroxyethyl-m-chloroaniline. | Do. |
| Do | N-2,2,2-trifluoroethyl-N-β-hydroxyethylaniline. | Do. |
| Do | N-2,2,2-trifluoroethyl-N-β,γ-dihydroxypropylaniline. | Do. |
| Do | N-3,3-difluoropropyl-N-β-hydroxyethylaniline. | Do. |
| Do | N-3,3-difluoropropyl-N-β-hydroxyethyl-m-ethylaniline. | red. |
| 6-chloro-2,4-bis(methylsulfonyl)-aniline. | N-2,2-difluoroethyl-N-β-hydroxyethylaniline. | brownish-orange. |
| Do | N-2,2-difluoroethyl-N-β-hydroxyethyl-2-methoxy-5-chloroaniline. | Do. |
| Do | N-3,3,3-trifluoropropyl-N-β-hydroxyethyl-2-methoxy-5-chloroaniline. | brownish-red. |
| 6-bromo-2,4-bis(methylsulfonyl)-aniline. | N-3,3-difluoropropyl-N-β-hydroxyethylaniline. | brownish-orange. |
| Do | N-3,3-difluoropropyl-N-β-hydroxyethyl-m-chloroaniline. | brownish-red. |
| Do | N-2,2-difluoroethyl-N-β,γ-dihydroxypropylaniline. | Do. |

Dye compounds corresponding to those described hereinbefore but which contain at least one —OSO₃H group or this group in its salt form have also been prepared. These dye compounds containing a sulfato group are prepared either by introducing a sulfato group into the dye compounds previously described or by introducing a sulfato group into the coupling components of the present invention and coupling the compounds thus obtained with the diazonium compounds used in the preparation of the new azo compounds of the invention. These new dye compounds are suitable for dyeing the textile materials mentioned hereinbefore as well as silk, wood and nylon textile materials. Because of the increased water solubility of these new dye compounds, they are particularly adapted for dyeing cones of yarn and fabrics of close weave and of heavy construction.

The following examples illustrate the manner in which these new sulfato dye compounds are prepared.

EXAMPLE 36

46.1 grams of 2,4-bis(methylsulfonyl)-benzeneazo - N - 2,2 - difluoroethyl - N - β - hydroxyethylaniline (dye of Example 1) are dissolved in 500 cc. of carbon tetrachloride and the resulting solution is cooled to 10 C. Then 12.7 grams of freshly distilled chlorosulfonic acid are added dropwise with stirring over a period of 3 hours. After the addition of the chlorosulfonic acid, the reaction mixture is slowly warmed to 50 C. and maintained at this temperature for several hours. Heating is then discontinued and the carbon tetrachloride is distilled off under reduced pressure. 300 cc. of ice and water are then added to the reaction mixture and the dye is recovered by evaporation. If a salt form of the dye is desired, the evaporation step is omitted. Instead, following the addition of the 300 cc. of ice and water, the reaction mixture is neutralized with sodium hydroxide (other suitable organic or inorganic bases can be used), warmed to dissolve the dye, filtered to remove any insoluble material and then concentrated under reduced pressure until the dye separates. The dye compound thus obtained has the formula:

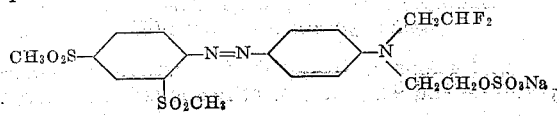

It colors cellulose acetate, wool, nylon and silk textile materials orange shades.

EXAMPLE 37

47.5 grams of 2,4-bis(methylsulfonyl)benzeneazo - N - 2,2 - difluoro -n - propyl - N - β - hydroxyethylaniline (dye of Example 2) are dissolved in 200 cc. of pyridine and the resulting solution is cooled to 5 C. Then 12.7 grams of chlorosulfonic acid are added dropwise with stirring over a period of 3 hours. Stirring is continued for an additional 2 hours following which the reaction mixture is heated to 50 C. and maintained at this temperature for two hours. Following this the reaction mixture is cooled and the pyridine is removed under reduced pressure. 300 cc. of ice and water are then added to the reaction mixture and the dye is recovered by evaporation. The dye compound obtained colors cellulose acetate textile materials orange shades.

EXAMPLE 38

49.5 grams of 6-chloro-2,4-bis(methylsulfonyl)-benzeneazo - N - 2,2 - difluoroethyl - N - β - hydroxyethylaniline (dye of Example 4) are mixed with 50 cc. of sulfuric acid (sp. gr. 1.84) and the reaction mixture resulting is warmed to 50 C. for 3 hours and then cooled to 0 C. 200 cc. of ice and water are added and the reaction mixture is made neutral to Congo Red paper with sodium bicarbonate. The dye compound formed is recovered by filtration and washed with cold salt water. The dye compound thus obtained colors cellulose acetate, silk, wool and nylon brownish-orange shades.

EXAMPLE 39

24.9 grams of 2,4-bis(methylsulfonyl)-aniline are diazotized in accordance with the procedure described in Example 1 and the diazonium compound obtained is coupled with 32.1 grams of the sodium salt of N-2,2,2-trifluoroethyl-N-β-sulfatoethylaniline. Coupling and recovery of the dye compound formed is carried out in accordance with the procedure described in Example 1. The dye compound obtained colors cellulose acetate, wool, silk and nylon yellowish-orange shades.

From the foregoing examples the manner of introducing a sulfato group into any of the azo compounds of my invention is believed to be clear, especially since the manner of introducing a sulfato group is known to those skilled in the art. Any other suitable way of introducing the sulfato group into the dye molecule can be employed. The sulfato group can be present in its free acid form or in the form of an inorganic or organic base salt such as, for example, the Na, K, NH4, Mg, Ca, Li, methylamine, dimethylamine, trimethylamine, pyridine, aniline, guanidine, semicarbazide, biguanidine, phenyl guanidine, cyclohexylamine, dicyclohexylamine, tetrahydrofurfurylamine or alkanolamine salt form.

In order that the preparation of the azo compounds of my invention may be clearly understood, the preparation of certain intermediates used in their manufacture is described hereinafter.

*Example A.—6-chloro-2,4-bis(methylsulfonyl)- aniline*

24.9 grams of 2,4-bis(methylsulfonyl)-aniline suspended in 100 cc. of concentrated HCl and 50 cc. of glacial acetic acid were placed in a 500 cc., 3-necked flask fitted with a stirrer and cooled in an ice bath and than 0.5 gram of FeCl3 were added.

Chlorine was bubbled slowly into the reaction mixture, while stirring, and while keeping the temperature at 20 C.–25 C. for 4–5 hours. The reaction mixture was then drowned in an excess of cold water to precipitate the 6-chloro-2,4-bis(methylsulfonyl)-aniline formed by the reaction and which was recovered by filtration, washed neutral and dried. About 26.2 grams of a straw-colored crystalline product was obtained.

*Example B.—6-bromo-2,4-bis(methylsulfonyl)- aniline*

24.9 grams of 2,4-bis(methylsulfonyl)-aniline suspended in 100 cc. of concentrated HCl and 30 cc. of glacial acetic acid were placed in a 500 cc., 3-necked flask fitted with a stirrer and cooled in an ice bath. 16 grams of bromine dissolved in 30 cc. of glacial acetic acid were gradually added, with stirring, over a period of 4 hours while maintaining the temperature at 20–25 C. The reaction mixture was then poured into an excess of cold water to precipitate the 6-bromo-2,4-bis(methylsulfonyl)-aniline formed by the reaction and which was recovered by filtration, washed with cold water and dried. About 29.5 grams of a yellow crystalline product was obtained.

2,4-bis(methylsulfonyl)-aniline is a known compound. It is a substantially white crystalline solid melting at about 199–202 C.

Compounds having the formula:

IV 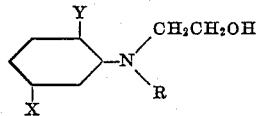

are prepared by reacting ethylene oxide with a compound having the formula:

V 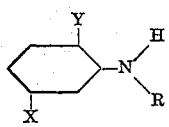

R, X and Y in the foregoing formulas have the meaning previously assigned to them.

The following examples are illustrative of the manner in which the compounds of the formula numbered IV are prepared.

*Example C.—N-2,2-difluoroethyl-N-β-hydroxyethylaniline*

15.7 grams of N-2,2-difluoroethylaniline, 5.2 grams of ethylene oxide and 15 cc. of ethyl alcohol are sealed in a glass tube and heated at 200 C.–205 C. for 18–20 hours with shaking in an autoclave. Upon distillation of the reaction mixture under reduced pressure through a 10" indented column, 18 grams of N-2,2-difluoroethyl-N-β-hydroxyethylaniline boiling at 123 C.–125 C./3 mm. are obtained. About 1.5 grams of N-2,2-difluoroethylaniline are also recovered.

*Example D.—N-2,2-difluoro-n-propyl-N-β-hydroxyethylaniline*

7.9 grams of N-2,2-difluoro-n-propylaniline, 1.9 grams of ethylene oxide and 10 cc. of ethyl alcohol are heated with shaking in a sealed tube for 8 hours at 185 C. The contents of the tube are cooled, removed from the tube and distilled under reduced pressure. About 3 grams of N-2,2-difluoro-n-propyl-N-β-hydroxyethylaniline boiling at 155 C.–160 C./11 mm. are obtained.

*Example E.—N-2,2-difluoro-n-propyl-N-β-hydroxyethyl-m-chloroaniline*

7.6 grams of N-2,2-difluoro-n-propyl-m-chloroaniline, 1.9 grams of ethylene oxide and 5 cc. of ethyl alcohol are heated with shaking in a sealed tube for 15 hours at 200 C. Then the contents of the tube are cooled, removed from the tube and distilled under reduced pressure. 3 grams of N-2,2-difluoro-n-propyl-N-β-hydroxyethyl-m-chloroaniline boiling at 165 C.–170 C./6 mm. are obtained.

*Example F.—N-2,2,2-trifluoroethyl-N-β-hydroxyethylaniline*

13.5 grams of N-2,2,2-trifluoroethylaniline, and 4.84 grams of ethylene oxide dissolved in 10 cc. of ethyl alcohol are sealed in a glass tube and heated at 210 C.–220 C. for 20 hours, with shaking, in an autoclave. Upon cooling, the contents of the tube are removed. After removal of the alcohol by distillation at atmospheric pressure the reaction mixture is distilled under a reduced pressure of 1–2 mm. 16 grams of N-2,2,2-trifluoroethyl-N-β-hydroxyethylaniline boiling at 102 C.–103 C./1.5 mm. are obtained.

*Example G.—N-3,3,3-trifluoropropyl-N-β-hydroxyethylaniline*

28.4 grams of N-3,3,3-trifluoropropylaniline and 8 grams of ethylene oxide dissolved in 30 cc. of ice-cold ethyl alcohol are placed in an ice-cold glass tube. The tube is sealed and fastened into a shaking autoclave and heated at 185 C. for 24 hours with shaking. Upon cooling the autoclave and opening the tube, the reaction product is fractionated directly, first under atmospheric pressure to remove the ethyl alcohol and then under a reduced pressure of about 2 mm. An 84% yield of N-3,3,3-trifluoropropyl-N-β-hydroxyethylaniline boiling at 119 C.–120 C./2 mm. $N_D^{20}$ 1.5018 is obtained. Some unreacted N-3,3,3-trifluoropropylaniline is also recovered and distills over prior to the desired reaction product.

*Example H.—N-2,2,2-trifluoroethyl-N-β-hydroxyethyl-m-chloroaniline*

20.9 grams of N-2,2,2-trifluoroethyl-m-chloroaniline and 5.2 grams of ethylene oxide dissolved in 10 cc. of ice-cold ethyl alcohol are placed in an ice-cold glass tube. The tube is sealed and fastened in a shaking autoclave which is heated to 185 C.–195 C. and maintained at this temperature for 16 to 18 hours. Upon cooling, the reaction mixture is removed from the tube and fractionated directly, first under atmospheric pressure to remove the ethyl alcohol and then under a reduced pressure of about 1 mm. 8 grams of N - 2,2,2 - trifluoroethyl - N - β-hydroxyethyl-m-chloroaniline boiling at 134 C.–137 C. are obtained.

*Example I.—N-2,2,2-trifluoroethyl-N-β-hydroxyethyl-m-chloroaniline*

20.9 grams of N-2,2,2-trifluoroethyl-m-chloroaniline and 5.2 grams of ethylene oxide dissolved in 10 cc. of ice-cold ethyl alcohol are placed in an ice-cold glass tube. The tube is sealed and fastened in a shaking autoclave which is heated to 185 C.–195 C. and maintained at this temperature for 16 to 18 hours. Upon cooling, the reaction mixture is removed from the tube and fractionated directly, first under atmospheric pressure to remove the ethyl alcohol and then under a reduced pressure of about 1 mm. 8 grams of N-2,2,2-trifluoroethyl-N-β-hydroxyethyl-m-chloroaniline boiling at 134 C.–137 C. are obtained.

In a manner similar to that described in Examples C, D, E, F, G, H and I, N-2,2,2-trifluoroethyl-N-β-hydroxyethyl-m-toluidine, B. P. 103 C.–104 C./2 mm.; N-2,2,2-trifluoroethyl-N-β-hydroxyethyl-m-ethylaniline, B. P. 114 C.–117 C./1.5 mm.; N-2,2,2-trifluoroethyl-N-β-hydroxyethyl-m-bromoaniline, B. P. 153 C.–157 C./2 mm.; N-3,3,3-trifluoropropyl-N-β-hydroxyethyl-m-chloroaniline, B. P. 145 C./2 mm.; N-2,2-difluoroethyl - N - β-hydroxyethyl-m-chloroaniline, B. P. 180 C./14 mm.; N-2,2-difluoroethyl-N-β-hydroxyethyl-m-toluidine, B. P. 120 C./2 mm.; N - 2,2 - difluoro-n-propyl-N-β-hydroxyethyl-m-ethylaniline, B. P. 130 C.–132 C./1 mm.; N-3,3-difluoropropyl-N-β-hydroxyethylaniline, B. P. 135 C.–136 C./2 mm.; N-3,3-difluoropropyl-N-β-hydroxyethyl-m-toluidine, B. P. 130 C./1 mm.; N-3,3 - difluoropropyl - N-β-hydroxyethyl-m-ethylaniline, B. P. 131 C.–132 C./1 mm.; N-2,2-difluoro-n-propyl-N-β-hydroxyethyl-m-ethylaniline, B. P. 131 C.–132 C./1 mm.; N-2,2-difluoroethyl-N-β-hydroxyethyl - 2 - methoxy-5-chloroaniline, N-2,2,2 - trifluoroethyl - N-β-hydroxyethyl-2-methoxy-5-bromoaniline, etc. are prepared.

Compounds having the formula:

VI
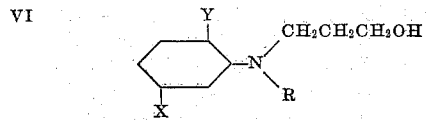

wherein R, X and Y have the meaning previously assigned to them are prepared by reacting trimethylene chlorohydrin (ClCH2CH2CH2OH) or trimethylene bromohydrin (BrCH2CH2CH2OH) with a compound having the formula V.

The following examples are illustrative of the manner in which the compounds having the formula numbered VI are prepared.

*Example J.—N-2,2,2-trifluoroethyl-N-γ-hydroxypropylaniline*

52.5 grams of N-2,2,2-trifluoroethylaniline and 30 grams of trimethylene chlorohydrin are heated together on a steam bath for 10 hours. The reaction mixture is cooled and 10% aqueous NaOH is added thereto until it is alkaline. The reaction mixture is then treated with benzene and the benzene portion is removed, washed with water and distilled under reduced pressure. N - 2,2,2 - trifluoroethyl-N-γ-hydroxypropylaniline boiling at 122 C.–124 C./2 mm. is obtained.

*Example K.—N-2,2,2-trifluoroethyl-N-γ-hydroxypropyl-m-toluidine*

56.7 grams of N-2,2,2-trifluoroethyl-m-toluidine, 46.4 grams of trimethylenebromohydrin and 30.5 grams of NaHCO3 are heated at 140 C. for 6 hours with stirring. Upon cooling, benzene is added to the reaction mixture and the reaction mixture is filtered. The benzene is removed from the filtrate, for example, by distillation over a water bath, and the portion remaining is distilled under reduced pressure to obtain N-2,2,2-trifluoroethyl-N-γ-hydroxypropyl-m-toluidine boiling at 126 C.–128 C./2 mm.

*Example L.—N-2,2-difluoroethyl-N-γ-hydroxypropyl-m-toluidine*

51.3 grams of N-2,2-difluoroethyl-m-toluidine are reacted with 30 grams of trimethylene chlorohydrin in accordance with the procedure described in Example J. N-2,2-difluoroethyl-N-γ-hydroxypropyl-m-toluidine boiling at 134 C.–138 C./2 mm. is obtained.

Following the procedure described in Examples J, K and L, N-2,2,2-trifluoroethyl-N-γ-hydroxypropyl-m-chloroaniline, B. P. 154 C.–157 C./2.5 mm.; N-2,2,2-trifluoroethyl-N-γ-hydroxypropyl-m-bromoaniline, B. P. 165 C.–170 C./2.5 mm.; N-3,3,3-trifluoropropyl-N-γ-hydroxypropylaniline, B. P. 131 C.–135 C./2 mm.; N-3,3,3-trifluoropropyl-N - γ - hydroxypropyl-m-chloroaniline, 164 C.–167 C./2.5 mm.; N-3,3,3-trifluoropropyl-N-γ - hydroxypropyl-m-toluidine, 133 C.–137 C./1.5 mm.; N-3,3-difluoropropyl-N-γ-hydroxypropylaniline, B. P. 122 C.–126 C./1–2 mm.; N-2,2-difluoro-n-propyl-N-γ-hydroxypropylaniline, B. P. 137 C.–140 C./1 mm.; N-2,2-difluoro-n-propyl-N-γ-hydroxypropyl-m - chloroaniline, N-2,2-difluoro - n - propyl-N-γ-hydroxypropyl - m - toluidine, N-3,3-difluoropropyl-N-γ-hydroxypropyl-m-toluidine, N-2,2-difluoroethyl-N-γ-hydroxypropylaniline, B. P. 117 C.–121 C./1–2 mm.; N-2,2-difluoroethyl-N-γ-hydroxypropyl-2-methoxy-5-chloroaniline, N-3,3-difluoropropyl-N-γ-hydroxypropyl-2-methoxy - 5 - bromoaniline, N-2,2-difluoroethyl-N-γ-hydroxypropyl-m-ethylaniline, etc. are prepared.

Compounds having the formula:

VII
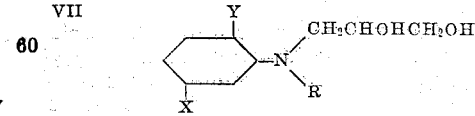

wherein R, X and Y have the meaning previously assigned to them are prepared by reacting glycerol chlorohydrin with a compound having the Formula V.

The following examples are illustrative of the manner in which the compounds having the formula numbered VII are prepared.

*Example M.—N-2,2-difluoro-n-propyl-N-β,γ-dihydroxypropylaniline*

17 grams of N-2,2-difluoro-n-propylaniline, 10 grams of NaHCO₃, 100 cc. of amyl alcohol and 12 grams of glyceryl chlorohydrin are heated together under refluxing conditions for 6-10 hours. Then 2 grams of charcoal are added and the reaction mixture is stirred and filtered to remove the charcoal, salt and any other insoluble material. The amyl alcohol is removed by distillation under reduced pressure and then the reaction mixture is steam-distilled under reduced pressure to remove any unchanged N-2,2-difluoro-n-propylaniline. Following this the reaction mixture is extracted with benzene and the benzene extract is distilled to dryness under reduced pressure. N-2,2-difluoro-n-propyl - N - β,γ - dihydroxypropylaniline is obtained. It is a straw-colored, viscous compound.

*Example N.—N-2,2,2-trifluoroethyl-N-β,γ-dihydroxypropylaniline*

This compound is obtained by reacting 17.5 grams of N-2,2,2-trifluoroethylaniline, 10 grams of NaHCO₃, 100 cc. of amyl alcohol and 12 grams of glyceryl chlorohydrin together in accordance with the procedure described in Example M.

*Example O.—N-3,3,3-trifluoropropyl-N-β,γ-dihydroxypropylaniline*

18.9 grams of N-3,3,3-trifluoropropylaniline and 9.2 grams of NaHCO₃ are stirred and heated together at 145 C. on an oil bath while 12.2 grams of glyceryl chlorohydrin are slowly added. After the addition, heating and stirring at 145 C. are continued for 6 hours. An equal volume of water is then added to the reaction mixture and the reaction mixture is extracted three times with benzene. The benzene solution is then steam-distilled leaving the reaction product as an oily residue. Upon distilling the crude product in a molecular still (e. g., a Hickman molecular still manufactured by Distillation Products, Inc., Rochester, N. Y.) under a reduced pressure of 22 microns at 105 C., N-3,3,3-trifluoropropyl-N-β,γ-dihydroxypropylaniline is obtained.

*Example P.—N-3,3,3-trifluoropropyl-N-β,γ-dihydroxypropyl-m-toluidine*

19.9 grams of N-3,3,3-trifluoropropyl-m-toluidine, 9.2 grams of NaHCO₃ and 12.2 grams of glyceryl chlorohydrin are heated together under refluxing conditions for 7 hours. Then 2 grams of charcoal are added and the reaction mixture is stirred awhile and then filtered to remove the charcoal, salt and any other insoluble material. The crude reaction product thus obtained is distilled in a molecular still under a reduced pressure of 13 microns at 95 C.-100 C. N-3,3,3-trifluoropropyl-N-β,γ-dihydroxypropyl-m - toluidine is obtained.

Following the procedure described in Examples M, N, O and P, N-2,2,2-trifluoroethyl-N-β,γ-dihydroxypropyl - m - chloroaniline, N-2,2,2-trifluoroethyl-N - β,γ-dihydroxypropyl-m-toluidine, N-3,3,3-trifluoropropyl - N-β,γ - dihydroxypropyl-m-chloroaniline, N-2,2-difluoroethyl-N-β,γ-dihydroxypropyl-m-toluidine, N-2,2-difluoro-n-propyl-N-β,γ-dihydroxypropyl-m-bromoaniline, N-2,2-difluoro-n-propyl-N- β,γ-dihydroxypropyl-m-toluidine, N-3,3-difluoropropyl-N-β,γ-dihydroxypropylaniline, N-2,2-difluoroethyl - N - β,γ-dihydroxypropylaniline, N-3,3-difluoropropyl-N-β,γ-dihydroxypropyl-m-chloroaniline, N-2,2-difluoroethyl - N - β,γ-dihydroxypropyl-m-ethylaniline, N-2,2-difluoroethyl - N - β,γ - dihydroxypropyl-2-methoxy-5-chloroaniline, etc. are prepared.

Compounds having the formula:

VIII 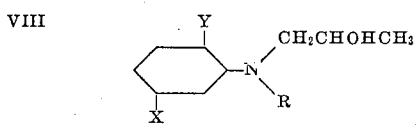

wherein R, X and Y have the meaning previously assigned to them are prepared by reacting propene oxide (propylene oxide) having the formula:

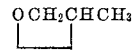

with a compound having the formula V.

The following examples are illustrative of the manner in which the compounds having the formula numbered VIII are prepared.

*Example Q. — N-2,2-difluoroethyl-N-β-hydroxypropylaniline*

15.7 grams of N-2,2-difluoroethylaniline, 6.85 grams of propene oxide and 15 cc. of ethyl alcohol are sealed in a glass tube and heated at 200 C.-205 C. for 18-20 hours, with shaking, in an autoclave. Upon distillation of the reaction mixture under reduced pressure about 18 grams of N-2,2-difluoroethyl-N-β-hydroxypropylaniline boiling at 131 C.-138 C./3 mm. are obtained.

*Example R. — N - 2,2,2 - trifluoroethyl - N - β-hydroxypropylaniline*

13.5 grams of N-2,2,2-trifluoroethylaniline, and 6.38 grams of propene oxide dissolved in 10 cc. of ethyl alcohol are sealed in a glass tube and heated at 210 C.-220 C. for 20 hours, with shaking, in an autoclave. Upon cooling, the contents of the tube are removed and distilled at atmospheric pressure to remove the ethyl alcohol, after which the reaction mixture is distilled under a reduced pressure of, for example, 1-2 mm. About 16 grams of N-2,2,2-trifluoroethyl-N-β-hydroxypropylaniline boiling at about 110 C.- 111 C./1.5 mm. are obtained.

*Example S. — N - 3,3,3 - trifluoropropyl - N - β-hydroxypropyl-m-toluidine*

30.5 grams of N-3,3,3-trifluoropropyl-m-toluidine and 10.5 grams of propene oxide dissolved in 100 cc. of ice-cold ethyl alcohol are placed in an ice-cold autoclave glass liner. The liner is then placed in an autoclave and heated at 185 c. for 24 hours with shaking. Upon cooling the autoclave, the reaction mixture is removed and fractionated directly, first under atmospheric pressure to remove the ethyl alcohol and then under a reduced pressure of about 2 mm. About an 80% yield of N-3,3,3-trifluoropropyl-N-β-hydroxypropyl-m-toluidine boiling at about 136 C.-137 C./2 mm. is obtained. Some unreacted N - 3,3,3 - trifluoropropyl - m - toluidine which distills over prior to the desired reaction product is also recovered.

Following the procedure described in Examples Q, R and S, N-2,2-difluoro-n-propyl-N-β-hydroxypropylaniline, B. P. 163 C.-168 C./11 mm.; N - 2,2 - difluoro - n - propyl - n - β - hydroxypropyl-m-chloroaniline, B. P. 173 C.-178 C./6 mm.; N-2,2,2-trifluoroethyl-N-β-hydroxypropyl-m-toluidine, B. P. 111 C.-112 C./2 mm.; N-2,2,2-trifluoroethyl - N - β - hydroxypropyl - m - ethylaniline, B. P. 122 C.-125 C./1.5 mm.; N-2,2,2-trifluoroethyl - N - β - hydroxyethyl - m - bromoaniline, B. P. 161-165 C./2 mm.; N-3,3,3-trifluoropropyl - N - β - hydroxypropyl - m - chloroaniline, B. P. 153 C./2 mm.; N-2,2-difluoroethyl-N-β-hydroxypropyl-m-chloroaniline, B. P. 188 C.–190 C./14 mm.; N-2,2-difluoroethyl-N-β-hydroxypropyl-m-toluidine, B. P. 128 C./2 mm.; N-3,3-difluoropropyl-N-β-hydroxypropylaniline, B. P. 143–144 C./2 mm.; N-3,3-difluoropropyl-N-β-hydroxypropyl-m-toluidine, B. P. 138 C./1 mm.; N-2,2-difluoro-n-propyl-N-β-hydroxypropyl-m-ethylaniline, B. P. 139 C.–140 C./1 mm.; N-2,2-difluoroethyl-N-β-hydroxypropyl-2-methoxy-5-chloroaniline; etc. are prepared.

Compounds having the formula numbered V are prepared by reacting a compound having the formula:

IX 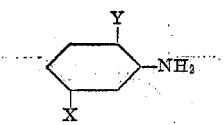

wherein X and Y have the meaning previously assigned to them, with 1,1-difluoro-2-bromoethane or 1,1-difluoro-2-chloroethane, 1,1,1-trifluoro-2-bromoethane or 1,1,1-trifluoro-2-chloroethane, 3,3-difluoro-n-propylbromide (CHF$_2$CH$_2$CH$_2$Br)

2,2-difluoro-n-propylbromide (CH$_3$CF$_2$CH$_2$Br) and 1,1,1-trifluoro-3-chloropropane (CF$_3$CH$_2$CH$_2$Cl)

respectively.

The following examples are illustrative of the manner in which the compounds having the formula numbered V are prepared.

Example T.—N-2,2-difluoroethylaniline 72.5 grams of 1,1-difluoro-2-bromoethane, 46.5 grams of aniline, 42 grams of sodium bicarbonate and 1 gram of sodium iodide are heated together with shaking in an autoclave for 15 hours at 150 C. After cooling to room temperature, the reaction mixture is removed from the autoclave by washing with benzene (200 grams) and water and filtered to remove a small amount of insoluble material. The benzene layer is washed with water and then the benzene is removed by distillation. Upon distillation under reduced pressure through a 12″ indented column, 66 grams of N-2,2-difluoroethylaniline, boiling at 104 C.–106 C./19 mm. are obtained.

Example U.—N-2,2-difluoro-n-propylaniline 28 grams of aniline, 43 grams of 2,2-difluoro-n-propylbromide, 25 grams of sodium bicarbonate and 1 gram of sodium iodide are placed in an autoclave and heated 24 hours at 170 C. with shaking. The reaction mixture is then cooled, washed out of the autoclave with benzene and filtered. The benzene is then removed from the filtrate and the residue containing the desired reaction product is distilled under reduced pressure. A good yield of N-2,2-difluoro-n-propylaniline boiling at 103 C.–107 C./12 mm. is obtained.

Example V.—N-3,3-difluoro-n-propylaniline

By use of 43 grams of 3,3-difluoro-n-propylbromide in place of 2,2-difluoro-n-propylbromide in Example W, N-3,3-difluoro-n-propylaniline boiling at 125 C.–126 C./16 mm. is obtained.

Example W.—N-3,3,3-trifluoropropylaniline 46.5 grams of aniline and 33.3 grams of CF$_3$CH$_2$CH$_2$Cl are placed in a glass tube. The tube is sealed, fastened in a shaking autoclave and heated up to 185 C. with shaking. Heating at 185 C. with shaking is continued for 24 hours and then the autoclave is cooled. On opening the tube, the reaction mixture is treated with an excess of 10% NaOH solution to decompose any aniline hydrochlorides present, and the oily layer is taken up in a small amount of benzene. The benzene layer is washed until neutral and dried over Drierite (anhydrous calcium sulfate) after which it is fractionated under atmospheric pressure to remove the benzene and then under a reduced pressure of about 15 mm. Aniline is first recovered and then better than a 50% yield of N-3,3,3-trifluoropropylaniline boiling at 101 C.–103 C./15 mm., $N_D^{20}$ 1.4847.

Example X.—N-3,3,3-trifluoropropyl-m-toluidine 53.5 grams of m-toluidine and 33.3 grams of CF$_3$CH$_2$CH$_2$Cl are heated in a sealed tube in a shaking autoclave at 185 C. for 24 hours in accordance with the procedure described in Example W. A good yield of N-3,3,3-trifluoropropyl-m-toluidine boiling at 114 C.–116 C./15 mm., $N_D^{20}$ 1.4848 is obtained.

Example Y.—N-2,2,2-trifluoroethylaniline 40 grams of 1,1,1-trifluoro-2-chloroethane and 64.6 grams of aniline are placed in a glass tube cooled in an acetone Dry Ice bath. The tube is sealed, fastened in a shaking autoclave and heated at 250 C.–255 C. for thirty hours. Upon cooling, the tube is opened and the contents poured into a mixture of 420 cc. of water and 80 grams of hydrochloric acid (sp. gr. 1.18). The dilute acid completely dissolves any unreacted aniline while the less basic N-trifluoroethylaniline and by-product diphenylamine are insoluble. The reaction mixture is extracted with two 50-gram portions of benzene. The two benzene extracts are combined, washed free of acid and then distilled under a reduced pressure of about 15 mm. 24.1 grams of N-2,2,2-trifluoroethylaniline boiling at 84 C.–85 C./15 mm., $N_D^{20}$ 1.4820 are obtained.

Following the procedure described in Examples T, U, V, W, X and Y, N-2,2-difluoroethyl-m-toluidine, B. P. 140 C.–141 C./27 mm.; N-2,2-difluoroethyl-m-chloroaniline, B. P. 129 C.–133 C./16 mm.; N-2,2-difluoro-n-propyl-m-toluidine, B. P. 115 C.–117 C./12 mm.; N-2,2-difluoro-n-propyl-m-ethylaniline, B. P. 120 C.–123 C./12 mm.; N-2,2-difluoro-n-propyl-m-chloroaniline, B. P. 115 C.–120 C./7 mm.; N-2,2-difluoro-n-propyl-m-bromoaniline, B. P. 125 C.–128 C./7 mm.; N-3,3-difluoro-n-propyl-m-toluidine, B. P. 146 C.–147 C./27 mm.; N-3,3-difluoro-n-propyl-m-chloroaniline, B. P. 110 C.–114 C./4 mm.; N-2,2-difluoroethyl-m-ethylaniline, B. P. 103 C.–108 C./7 mm.; N-2,2-difluoroethyl-2-methoxy-5-chloroaniline, N-2,2,2-trifluoroethyl-2-methoxy-5-chloroaniline, N-2,2-difluoroethyl-2-methoxy-5-bromoaniline, N-2,2,2-trifluoroethyl-m-chloroaniline, B. P. 73 C./2 mm.; N-2,2,2-trifluoroethyl-m-toluidine, B. P. 96 C.–97 C./15 mm., $N_D^{25}$ 1.4797; N-3,3,3-trifluoropropyl-m-chloroaniline, B. P. 145 C./2 mm.; etc. are prepared.

1,1-difluoro-3-bromopropane (CHF$_2$CH$_2$CH$_2$Br) appears to be a new compound. It was prepared as described hereinafter.

Example Z.—Preparation of 1,1-difluoro-3-bromopropane 98 grams of 1,1,3-tribromopropane were placed in a 200 cc. round-bottomed flask fitted with a still-head and a well-cooled receiving flask. 107 grams of dry mercuric fluoride were then added and the reaction flask was gently heated with a free flame until reaction began. The reaction was then allowed to proceed briskly but not too vigorously (by cooling in a bath of ice water or heating, as required) until all the reaction product has distilled over at about 85 C.–100 C. The crude product was then steam-distilled, dried and fractionated. The main product was 1,1-difluoro-3-bromopropane, boiling point 92 C.–94 C. Using this procedure yields of 35–40% of pure 1,1-difluoro-3-bromopropane are obtained. A small amount of $CH_2FCH_2CH_2Br$ was present in the residue.

1,1,3-tribromopropane ($CHBr_2CH_2CH_2Br$) likewise appears to be a new compound. It was prepared as described hereinafter.

*Example AA.—Preparation of 1,1,3-tribromopropane*

1000 grams of bromoform and 30 grams of benzoyl peroxide were placed in a 1100 cc. shaking autoclave and ethylene was passed into the autoclave until a pressure of 700 lbs. per sq. inch was reached. The reaction mixture was then heated at 85 C. for 15 hours following which it was cooled, removed from the autoclave and fractionated under reduced pressure. About 600 grams of 1,1,3-tribromopropane boiling at 105 C.–107 C./30 mm. were obtained. Using the procedure just described or generally similarly procedures somewhat higher and somewhat lower yields were obtained. As high as 700 grams have been obtained. Also 100–150 grams of bromoform, 20–30 grams of a low boiling liquid and varying amounts of higher boiling compounds are recovered.

The azo dye compounds of my invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45 C.–55 C. and the textile material to be dyed is immersed in the dyebath, following which the temperature is gradually raised to 80 C.–90 C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

The procedure just described is applicable whether the dye compound contains a sulfato group or not. The dye compounds of the invention not containing a sulfato group are practically water-insoluble. Where a sulfato group is present, the water solubility is increased and in such case a greater amount of the dye will go into solution.

Widely varying amounts of dye can be used in the dyeing operation. The amount of dye used can be, for example, ⅓ to 3% (by weight) of that of the textile material although lesser or greater amounts of dye can be employed.

This application is a continuation-in-part of my copending applications Serial No. 631,468 filed November 28, 1945, now U. S. Patent 2,516,302; Serial No. 631,469 filed November 28, 1945, now U. S. Patent 2,516,303; Serial No. 109,056, filed August 6, 1949 and Serial No. 114,913 filed September 9, 1949. N-difluoroalkylaminobenzene compounds are described and claimed in my copending application Serial No. 624,943 filed October 26, 1945, now U. S. Patent 2,516,107. N-trifluoroalkylaminobenzene compounds are described and claimed in my copending application Serial No. 624,942 filed October 26, 1945, now U. S. Patent 2,516,106.

I claim:

1. The azo compounds having the general formula:

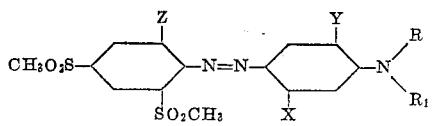

wherein R represents a member selected from the group consisting of a —$CH_2CHF_2$ group, a —$CH_2CF_3$ group, a —$CH_2CF_2CH_3$ group, a —$CH_2CH_2CHF_2$ group and a —$CH_2CH_2CF_3$ group, $R_1$ represents a member selected from the group consisting of a β-hydroxyethyl group, a β-hydroxypropyl group, a γ-hydroxypropyl group and a β,γ-dihydroxypropyl group, X represents a member selected from the group consisting of a hydrogen atom, a chlorine atom, a bromine atom, a methyl group and an ethyl group, Y represents a hydrogen atom and Z represents a member selected from the group consisting of a hydrogen atom, a chlorine atom and a bromine atom and wherein Y also represents a methoxy group when X is a chlorine atom or a bromine atom, and the sulfato form thereof.

2. The azo compound having the formula:

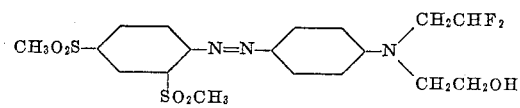

3. The azo compound having the formula:

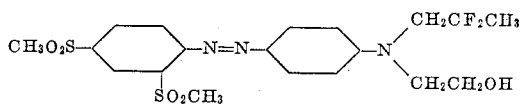

4. The azo compound having the formula:

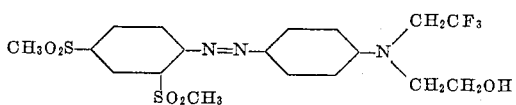

5. The azo compound having the formula:

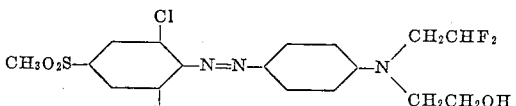

6. The azo compounds having the formula:

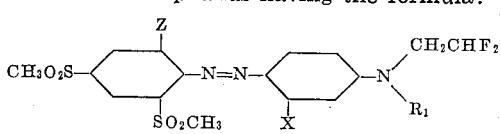

where $R_1$ represents a member selected from the group consisting of a β-hydroxyethyl group, a β-hydroxypropyl group, a γ-hydroxypropyl group and a β,γ-dihydroxypropyl group, X represents a member selected from the group consisting of a hydrogen atom, a chlorine atom, a bromine atom, a methyl group and an ethyl group and Z represents a member selected from the group consisting of a hydrogen atom, a chlorine atom and a bromine atom.

7. The sulfato form of the azo compounds defined by claim 1.

JOSEPH B. DICKEY.

REFERENCES CITED

The following references are of record in the file of this patent:

UNITED STATES PATENTS

| Number | Name | Date |
|---|---|---|
| 1,673,301 | Reddelien et al. | June 12, 1928 |
| 2,082,156 | Felix et al. | June 1, 1937 |
| 2,115,412 | Dahlen et al. | Apr. 26, 1938 |
| 2,147,338 | Felix et al. | Feb. 14, 1939 |
| 2,516,302 | Dickey | July 25, 1950 |
| 2,516,303 | Dickey | July 25, 1950 |